US008624564B2

(12) United States Patent
Hartman et al.

(10) Patent No.: US 8,624,564 B2
(45) Date of Patent: Jan. 7, 2014

(54) SWITCHED RELUCTANCE GENERATOR INITIAL ROTOR POSITION ESTIMATION (75) Inventors: Mark Hartman, Dunlap, IL (US); Robert Lindsey, Peoria, IL (US); Jackson Wai, Dunlap, IL (US); Jesse Gerdes, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 373 days.

(21) Appl. No.: 13/149,339

(22) Filed: May 31, 2011

(65) Prior Publication Data

US 2012/0161725 A1 Jun. 28, 2012

Related U.S. Application Data (60) Provisional application No. 61/426,863, filed on Dec. 23, 2010.

(51) Int. Cl.
*H02K 11/00* (2006.01)
*F01D 15/10* (2006.01)
*F02C 6/00* (2006.01)
*H02K 7/18* (2006.01)
*H02P 9/04* (2006.01)

(52) U.S. Cl.
USPC .............................. 322/99; 290/52

(58) Field of Classification Search
USPC .............................. 322/99; 290/52
See application file for complete search history.

(56) References Cited

U.S. PATENT DOCUMENTS

| | | | |
|---|---|---|---|
| 5,864,217 A | 1/1999 | Lyons et al. | 318/652 |
| 5,923,142 A | 7/1999 | Li | 318/701 |
| 6,020,711 A | 2/2000 | Rubertus et al. | 318/701 |
| 6,472,842 B1 | 10/2002 | Ehsani | 318/701 |
| 6,864,657 B1 | 3/2005 | Lungu | 318/701 |
| 7,412,339 B2 | 8/2008 | Ramu et al. | 702/65 |
| 7,755,308 B2 | 7/2010 | Kayikci et al. | 318/139 |
| 7,759,897 B2* | 7/2010 | Piippo | 318/700 |
| 8,106,618 B2* | 1/2012 | Fabis et al. | 318/661 |
| 8,384,232 B2* | 2/2013 | Myers et al. | 290/52 |
| 2002/0175652 A1 | 11/2002 | Kim et al. | 318/701 |
| 2007/0159119 A1 | 7/2007 | Adra et al. | 318/56 |
| 2008/0169782 A1* | 7/2008 | Piippo | 318/715 |
| 2009/0126369 A1 | 5/2009 | Walitzki et al. | 60/787 |
| 2009/0140745 A1 | 6/2009 | Williams et al. | 324/522 |
| 2010/0033122 A1 | 2/2010 | Hartman et al. | 318/490 |
| 2010/0253258 A1* | 10/2010 | Fabis et al. | 318/400.13 |
| 2011/0140646 A1* | 6/2011 | Campbell et al. | 318/798 |
| 2012/0013125 A1* | 1/2012 | Myers et al. | 290/52 |
| 2012/0212165 A1* | 8/2012 | Veijanen | 318/400.03 |
| 2013/0033254 A1* | 2/2013 | Shinnaka | 324/160 |
| 2013/0049661 A1* | 2/2013 | Cao et al. | 318/400.34 |
| 2013/0093375 A1* | 4/2013 | Cao et al. | 318/400.33 |

FOREIGN PATENT DOCUMENTS

| | | |
|---|---|---|
| KR | 1019980073978 | 11/1998 |
| KR | 1020060049792 | 5/2006 |

* cited by examiner

*Primary Examiner* — Pedro J Cuevas
(74) *Attorney, Agent, or Firm* — Miller, Matthias & Hull (57) ABSTRACT A method of estimating rotor speed of a generator 106 having a rotor 110 and a stator 112 is provided. The method may provide a source current to the stator 112, determine a relative rotor speed based on a sensor signal provided by a rotor speed sensor 130, determine a relative rotor position corresponding to the relative rotor speed, determine an absolute rotor position based on the sensor signal and phase currents, and calibrate the sensor signal based on an offset between the relative rotor position and the absolute rotor position.

20 Claims, 9 Drawing Sheets

SWITCHED RELUCTANCE GENERATOR INITIAL ROTOR POSITION ESTIMATION

CROSS-REFERENCE TO RELATED APPLICATION

This application is a non-provisional application claiming priority under 35 U.S.C. 119(e) to U.S. Provisional Application Ser. No. 61/426,863 filed on Dec. 23, 2010.

TECHNICAL FIELD

The present disclosure relates generally to electric drive assemblies, and more particularly, to systems and methods for calibrating the control of electric machines.

BACKGROUND

An electric machine is generally used to convert one form of energy into another and may include a motor, a generator, or any other electric machine having a rotational output or source. For instance, a motor may be used to convert electrical power into mechanical or rotational power, while a generator may be used to convert mechanical or rotational power into electrical power. More specifically, a generator of an electric drive assembly, such as an electrical power generation system, genset, or the like, is typically used to convert mechanical power received from a primary power source, such as a combustion engine, or the like, into electrical power that can be supplied to one or more electrical loads. Such a generator may also function as a motor to convert electrical power stored within a common bus or storage device of the electric drive into mechanical power. Among the various types of generators available for use with an electric drive assembly, switched reluctance generators have received great interest for being robust and cost-effective. While currently existing systems and methods for controlling electric machines, such as switched reluctance generators, provide adequate control, there is still room for improvement.

One aspect of electric drive control deserving attention pertains to the initial detection or estimation of the rotor position of the generator. Moreover, in order to efficiently operate the electric drive of a machine, it is important to accurately detect or monitor the current position of the rotor of the generator associated with the electric drive. Currently existing electric drives for switched reluctance generators, for example, may rely on a mechanically aligned speed wheel to keep track of the rotor position during use. However, such control schemes are susceptible to error, for example, during an initial rotor position detection stage, and further, become prone to a substantial loss in efficiency. For instance, an error of 2 degrees in the detected mechanical rotor position of a switched reluctance generator, caused by a skewed sensor, a mechanical misalignment of the speed wheel, or the like, may correspond to a 0.5% decrease in efficiency of the electric drive assembly at full load.

Accordingly, it is important to provide more accurate and robust means for determining the rotor position of generators, and thus, improve the overall efficiency of electric drive assemblies. The disclosed system and method is directed at addressing one or more of the needs set forth above.

SUMMARY OF THE DISCLOSURE

In one aspect of the present disclosure, a method of estimating rotor speed of a generator having a rotor and a stator is provided. The method provides a source current to the stator, determines a relative rotor speed based on a sensor signal provided by a rotor speed sensor, determines a relative rotor position corresponding to the relative rotor speed, determines an absolute rotor position based on the sensor signal and phase currents, and calibrates the sensor signal based on an offset between the relative rotor position and the absolute rotor position.

In another aspect of the disclosure, a rotor speed estimation system for a generator having a rotor and a stator is provided. The rotor speed estimation system includes a speed sensor configured to generate a sensor signal corresponding to a speed of the rotor relative to the stator, and a controller in electrical communication with the speed sensor and the stator. The controller is configured to determine a relative rotor position based on the sensor signal and phase currents, determine an absolute rotor position based on the sensor signal, and calibrate the sensor signal based on an offset between the relative rotor position and the absolute rotor position.

In yet another aspect of the disclosure, an electric drive assembly is provided. The electric drive assembly includes a generator having a stator and a rotor, at least one speed sensor, a converter circuit, and a controller. The rotor is coupled to a primary power source and rotatably disposed in close proximity to the stator. The speed sensor is configured to generate a sensor signal corresponding to a speed of the rotor relative to the stator. The converter circuit is configured to electrically communicate with the stator and at least one load via a common bus. The controller is in electrical communication with the speed sensor and the converter circuit. The controller is further configured to determine a relative rotor position based on the sensor signal and phase currents, determine an absolute rotor position based on the sensor signal, and calibrate the sensor signal based on an offset between the relative rotor position and the absolute rotor position.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
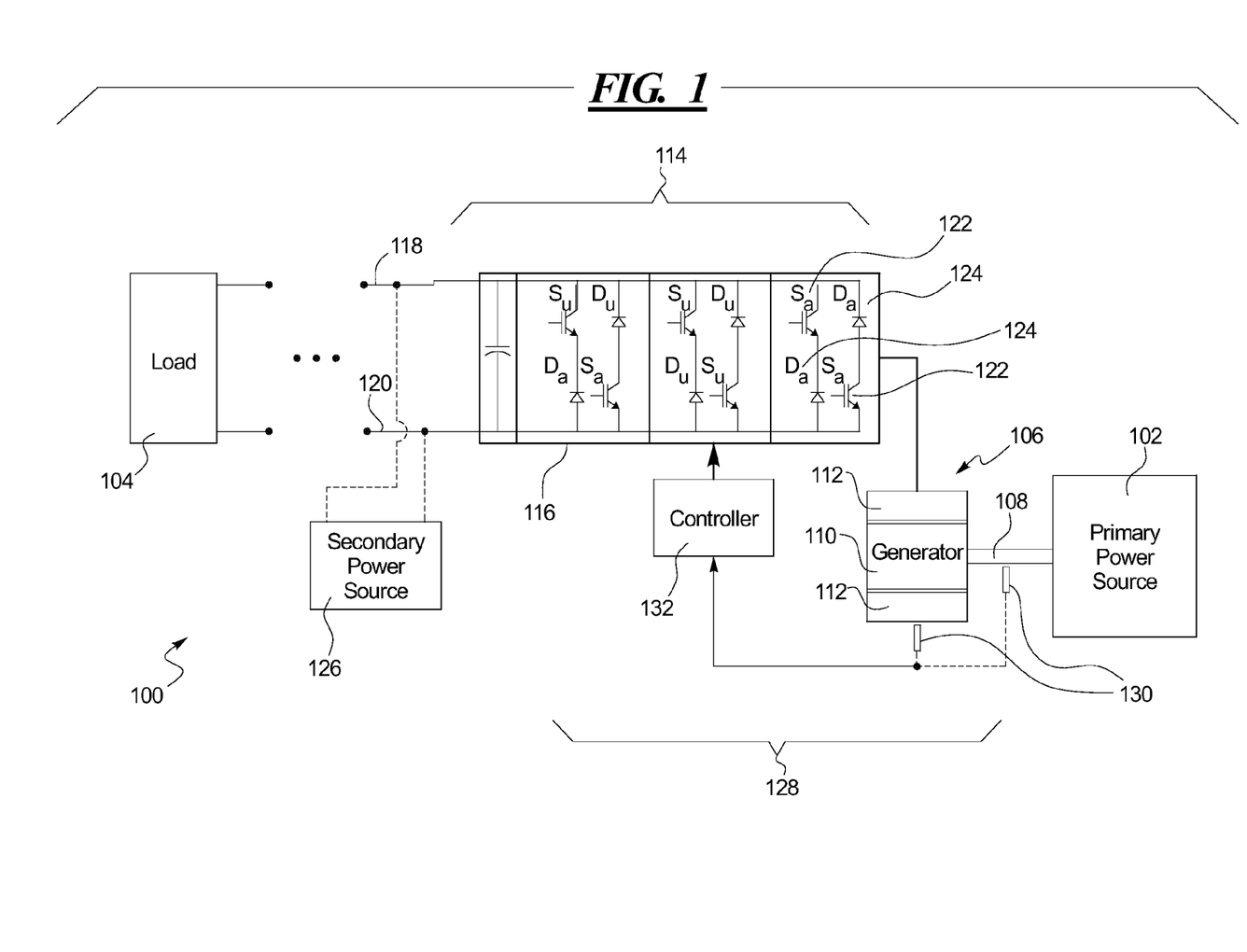
FIG. 1 is a schematic view of an exemplary embodiment of a rotor speed estimation system as applied to a typical electric drive.

FIG. 1 schematically illustrates an exemplary electric drive 100 that may be employed to communicate power between a primary power source 102 and one or more electrical loads 104. The primary power source 102 may include, for example, a diesel engine, a gasoline engine, a natural gas engine, or any other type of rotational source commonly used for generating power. The load 104 may include one or more devices or components which consume electrical power. For example, with respect to industrial work machines or mobile work vehicles, the load 104 may include one or more motors for operating tools of the machine and/or one or more traction motors for causing motion of the vehicle. The primary power source 102 may also be configured to mechanically transmit power to an electric machine 106 of the electric drive 100 via a coupling 108, such as an axially rotating drive shaft, or the like. The electric machine 106 may include any suitable machine configured to produce electrical power in response to an externally supplied rotational input.

In the particular embodiment of FIG. 1, the electric machine 106 may take the form of a switched reluctance generator that is configured to produce electrical power in response to rotational input from the primary power source, or engine 102. As is well known in the art, the generator 106 may include a rotor 110 that is rotatably disposed within a fixed stator 112. The rotor 110 of the generator 106 may be rotatably coupled to an output of the engine 102 via the coupling 108, or in other embodiments, via a direct crankshaft, a gear train, a hydraulic circuit, or the like. The stator 112 of the generator 106 may be electrically coupled to a common bus 114 of the electric drive 100 via a converter circuit 116. During a generating mode of operation, as the rotor 110 of the generator 106 is rotated within the stator 112 by the engine 102, electrical current may be induced within the stator 112 and supplied to the converter circuit 116. The converter circuit 116 may in turn convert the electrical signals into the appropriate direct current DC voltage for distribution to the electrical load 104 and/or any other device via the common bus 114. The common bus 114 may provide a positive line 118 and a negative or ground line 120 across which the common bus 114 may communicate a common DC bus voltage between one or more electrically parallel devices of the electric drive assembly 100. The load 104 may include circuitry for converting the DC voltage supplied by the converter circuit 116 into the appropriate electrical signals for operating any one or more devices associated with the electric drive 100. The generator 106 may additionally be enabled to cause rotation of the rotor 110 in response to electrical signals that are provided to the stator 112 from the common bus 114, for instance, during a motoring mode of operation, or when the electrical load 104 becomes the source of electrical power.

The converter circuit 116 may include a series of transistors or gated switches 122 and diodes 124 for selectively enabling one or more phase windings of the generator 106. A three-phase switched reluctance generator 106, for example, may be driven using a converter circuit 116 with six switches 122 and six diodes 124 for selectively enabling or disabling each of the three phases of the generator 106. Each of the switches 122 may further be enabled or disabled via gate signals while an external or secondary power source 126 provides power across the positive and negative lines 118, 120 of the common bus 114 to force current through the respectively enabled switches 122 and diodes 124. Initial power to the converter circuit 116 and the generator 106 may thus be supplied by a secondary power source 126 taking the form of, for example, a battery, residual voltage stored in a capacitor of the common bus 114, or any other suitable DC power supply.

Still referring to FIG. 1, the electric drive 100 may also be provided with an exemplary rotor speed estimation system 128 configured to calibrate the electric drive 100 based on the rotational frequency of the electric machine 106. The rotor speed estimation system 128 may include one or more speed sensors 130 and an associated controller 132. Moreover, the speed sensors 130 may include a Hall effect sensor, a variable reluctance sensor, an anisotropic magnetoresistance sensor, or any other suitable sensor that can be adapted to generate a speed sensor signal which corresponds to the rotational frequency of the rotor 110 relative to the stator 112. Furthermore, the speed sensors 130 may be disposed in close proximity to the rotor 110 and configured to determine the rotational frequency of the rotor 110 with respect to the stator 112. The speed sensors 130 may optionally be disposed in close proximity to the coupling 108, or any other rotational output of the engine 102, so as to indirectly provide feedback corresponding to the rotational frequency of the rotor 110 based on known mechanical relationships between the rotor 110 and the coupling 108 rigidly coupled thereto. By designating an initial reading of the speed sensors 130 as a reference and by tracking the speed sensor signals or rotational frequency of the rotor 110 from that reference, it may be possible to derive the position of the rotor 110 relative to the stator 112. The speed sensor signals generated by the speed sensors 130 may be transmitted to an input of the controller 132 for further processing.

In response to the speed sensor signals and based on analyses of the phase currents of the generator 106, the controller 132 of FIG. 1 may provide the appropriate gate signals to the converter circuit 116 so as to provide more efficient control of the associated generator 106. More specifically, the controller 132 may employ current sensors or any other suitable means for detecting the phase currents of the generator 106. Based on the detected phase currents and the detected frequencies and/or phases thereof, and using a closed loop circuit or algorithm, the controller 132 may be configured to supply a minimum phase current to the generator 106. Correspondingly, inductance caused by rotation of the rotor 110 within the generator 106 may vary the current, and further, generate a substantially sinusoidal counter or back-electromotive force BEMF. Analyses of the BEMF waveform may enable the controller 132 to additionally determine the speed as well as the absolute position of the rotor 110 within the generator 106. The controller 132 may be implemented using one or more of a processor, a microprocessor, a microcontroller, a digital signal processor (DSP), a field-programmable gate array (FPGA), an electronic control module ECM, an electronic control unit ECU, or any other suitable means for electronically controlling functionality of the rotor speed estimation system 128. The controller 132 may be configured to operate according to a predetermined algorithm or set of instructions for operating the electric drive 100 based on the speed or position of the rotor 110 and the overall operating conditions of the electric drive assembly 100. Such an algorithm or set of instructions may be preprogrammed or incorporated into a memory of the controller 132 as is commonly used in the art.

Figure 2:
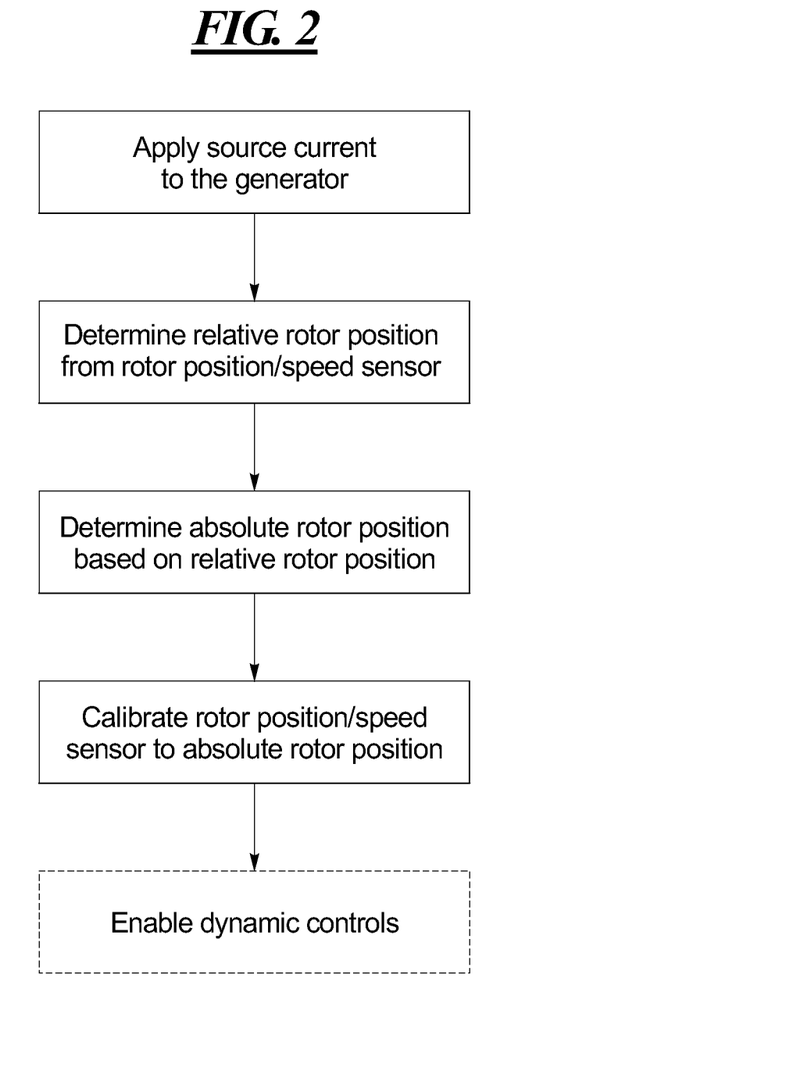
FIG. 2 is a flow diagram of a method of estimating rotor speed of a generator for an electric drive.
Figure 3:
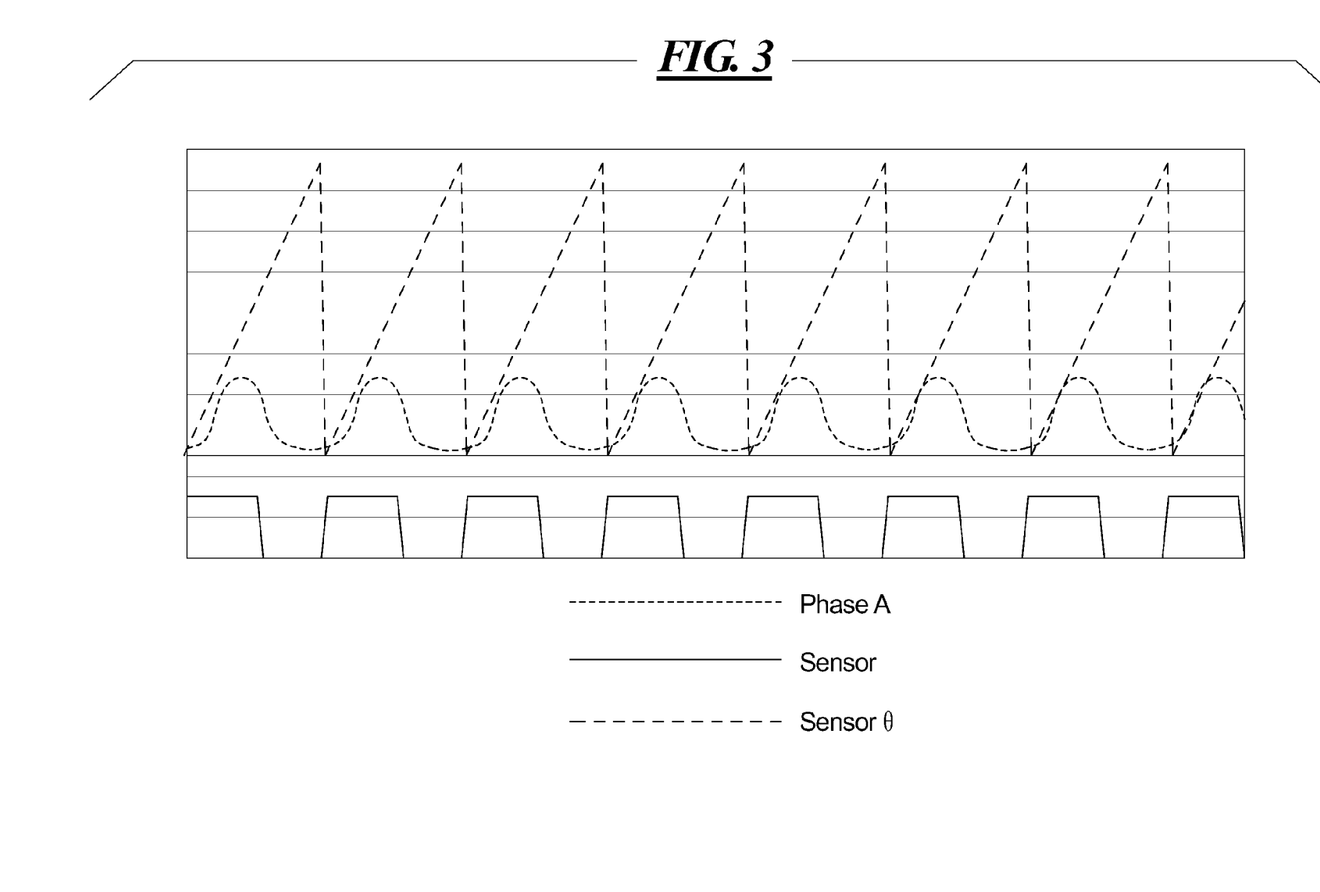
FIG. 3 is a graphical view of outputs of a speed sensor and a current sensor.

Referring now to FIG. 2, an exemplary method of estimating rotor speed is provided having a plurality of steps that may be selectively performed by the controller 132 periodically or, for example, during startup of the associated electric drive 100. In an initial step, the controller 132 may supply a DC source current to the generator 106 while the rotor 110 rotates from a primary power source 102 which enables the rotating machine inductance to generate a periodic waveform or phase current in each phase of the generator 106. As the rotor 110 rotates relative to the stator 112, the controller 132 may additionally monitor speed sensor signals provided by speed sensors 130 in order to determine a relative rotor speed, or the relative position of the rotor 110 with respect to the stator 112. More specifically, the speed sensor signals may respond to displacement of the rotor 110 with respect to the stationary stator 112, and exhibit square waveforms, as shown for example in FIG. 3. While the square waveforms may indicate the speed or frequency of the rotor 110, the corresponding phase of the speed sensor signal may provide an indication of the relative position of the rotor 110 relative to the stator 112. Accordingly, it may be possible to derive the relative rotor position based on the feedback provided by the speed sensors 130.

Figure 4:
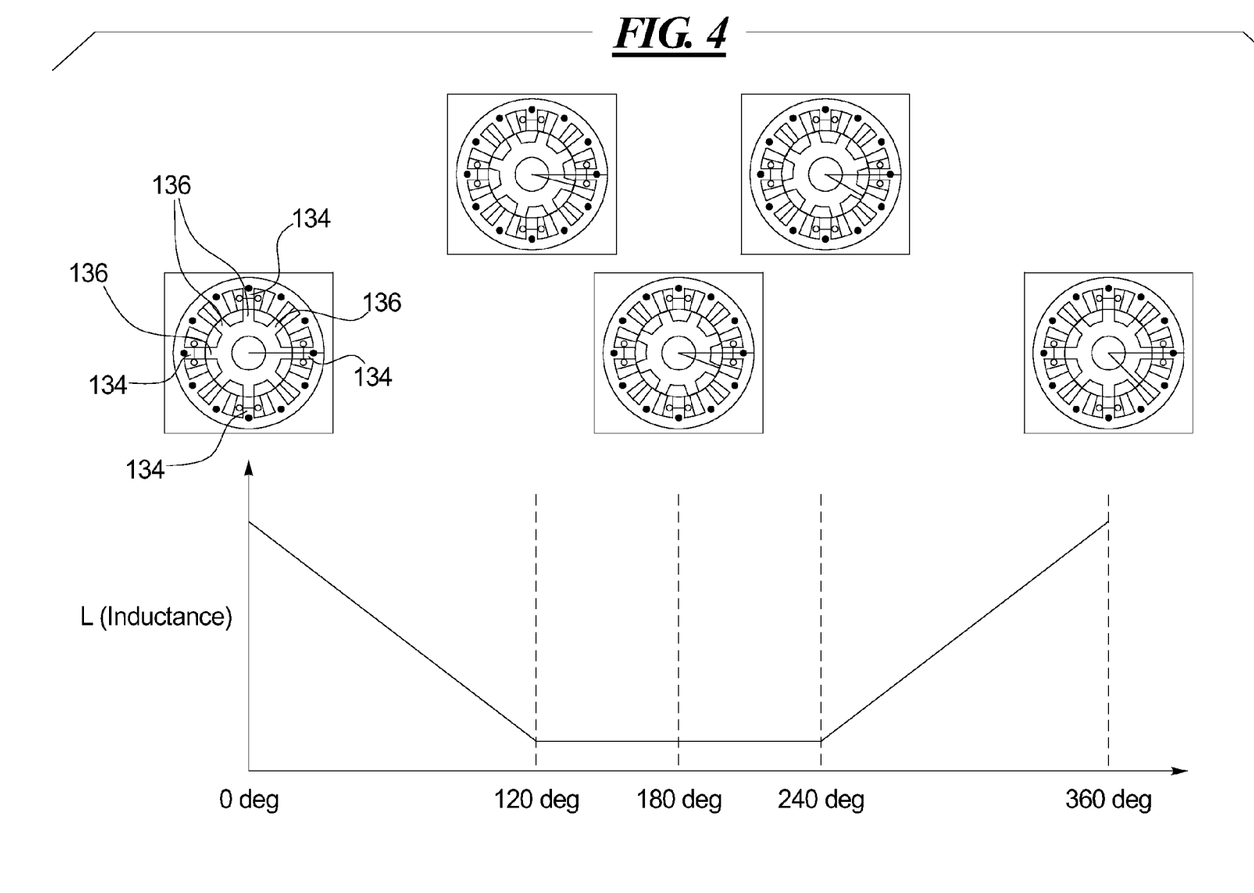
FIG. 4 is a graphical view of inductance as a function of rotor position.
Figure 5:
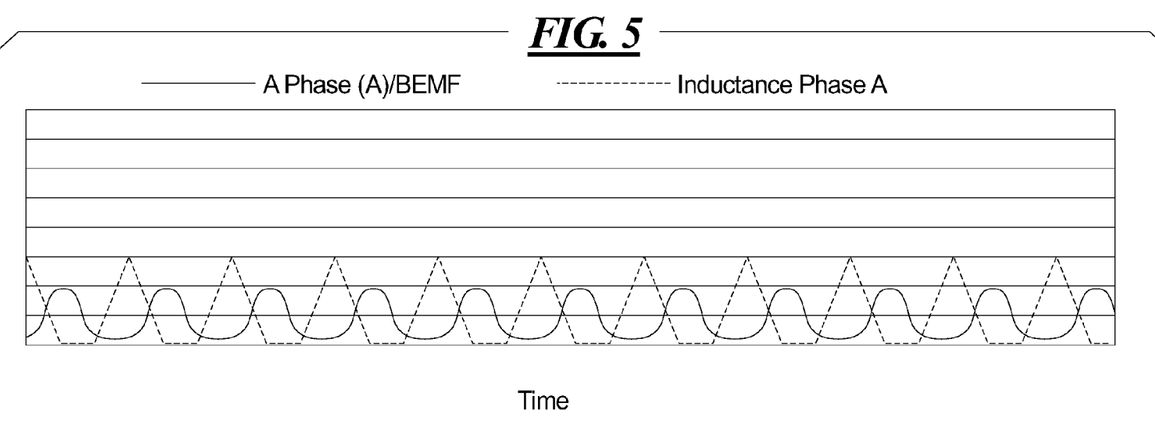
FIG. 5 is a graphical view of inductance in a generator and corresponding phase current.
Figure 6:
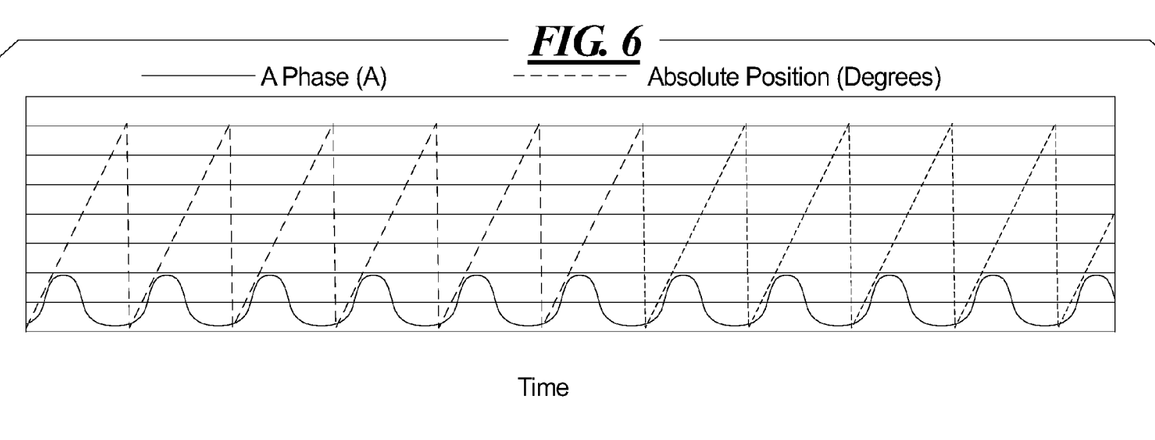
FIG. 6 is a graphical view of absolute rotor position of a generator and corresponding phase current.

As previously discussed, inductance as well as phase currents, and thus, BEMF of the generator 106 may vary as the rotor 110 rotates relative to the stator 112. As shown at 0° and 360° in FIG. 4, for example, the inductance may be greatest when the coiled teeth 134 of the stator 112 are in direct alignment with one of the poles 136 of the rotor 110. Correspondingly, the inductance generated by the generator 106 may be lowest when the coiled teeth 134 of the stator 112 are in complete misalignment with the poles 136 of the rotor 110. As shown in the graph of FIG. 5, when a smaller DC current is applied to the stator 112, changes in the inductance may in turn induce substantially sinusoidal phase currents or BEMF. Based on further analysis of the inductance and the resulting phase currents, it may be possible to determine a waveform indicative of the absolute rotor position, as shown in for example in FIG. 6 and as discussed more specifically below.

Figure 7:
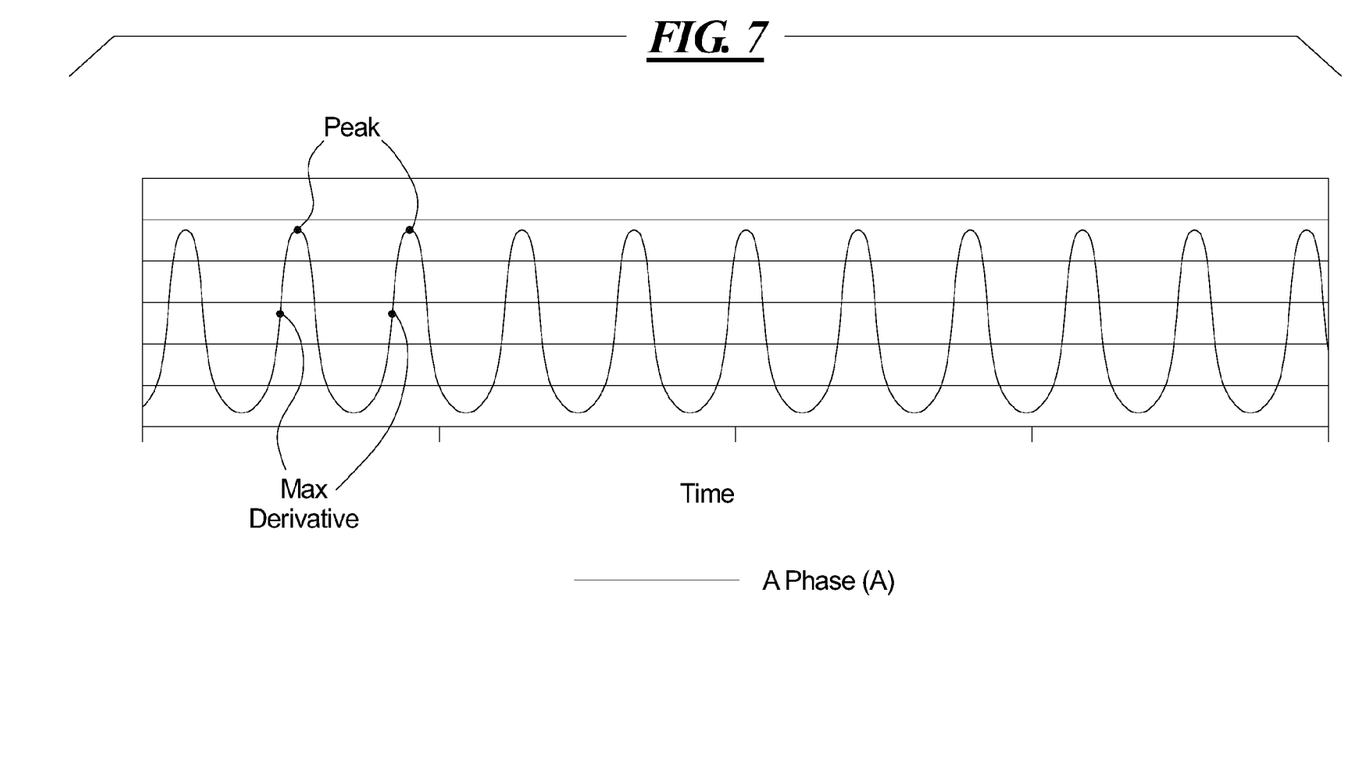
FIG. 7 is a graphical view of one phase current in a stator of a generator.
Figure 8:
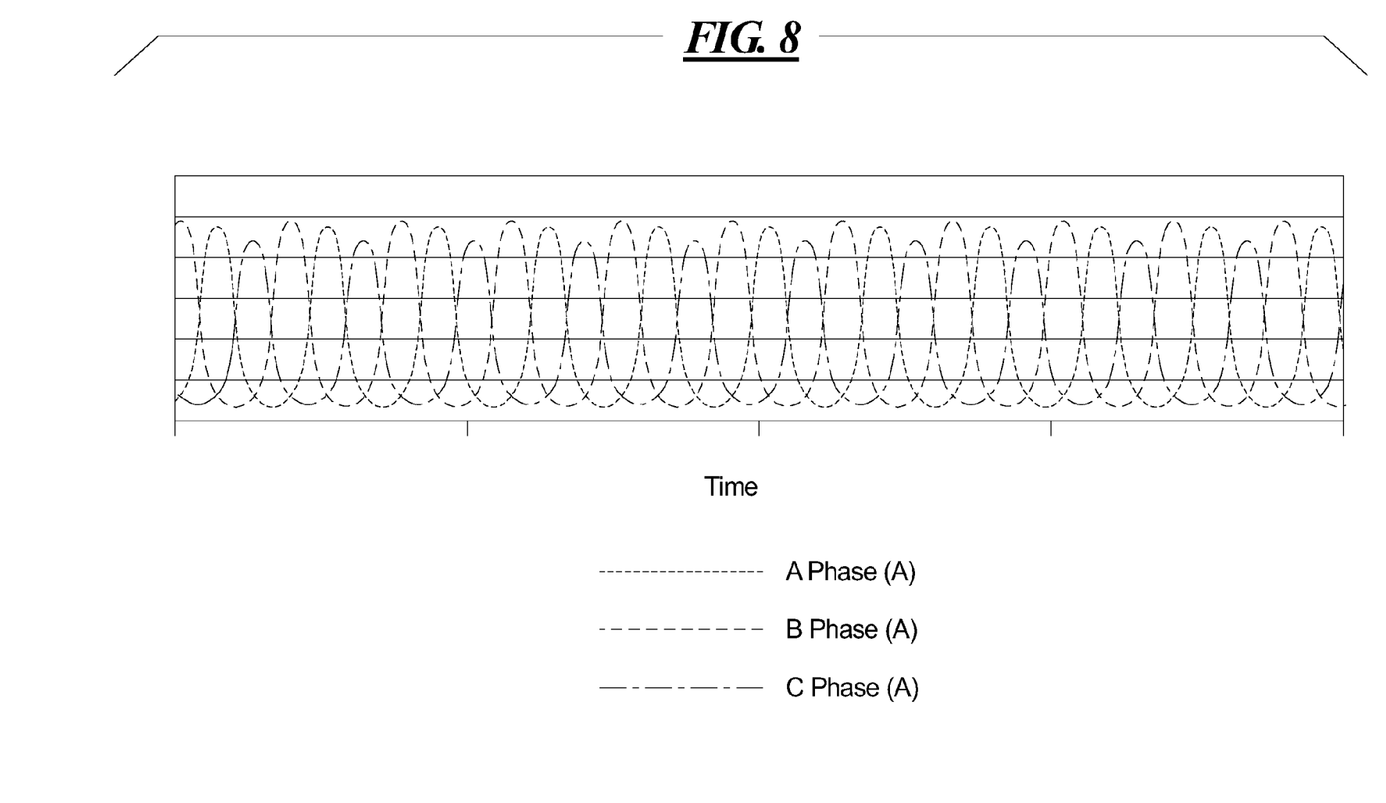
FIG. 8 is a graphical view of three phase currents in a stator of a generator.
Figure 9:
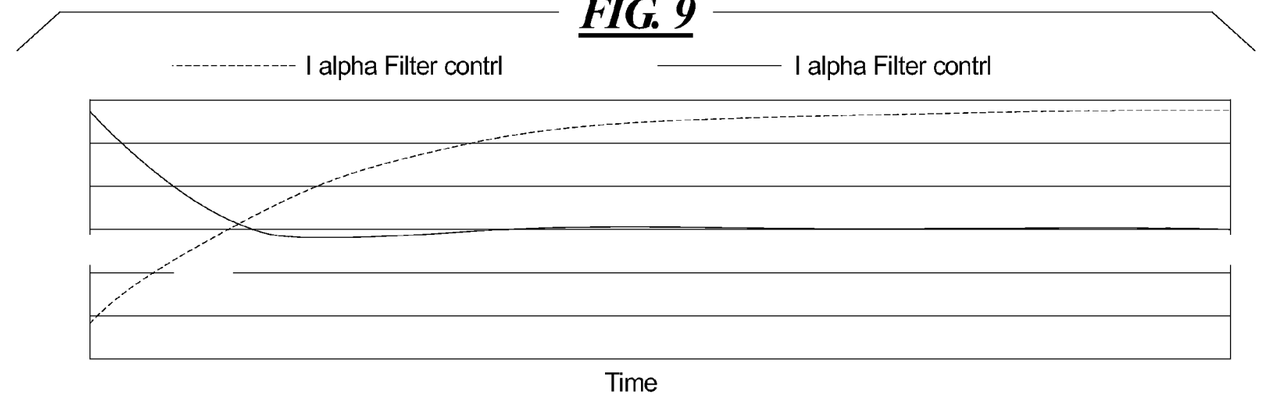
FIG. 9 is a graphical view of the three phase currents of FIG. 8 transformed into two direct current (DC) signals using a phase locked loop.

Referring back to FIG. 2, the controller 132 may monitor the phase currents and/or inductance of the generator 106 and employ the previously derived relative rotor position in order to determine an absolute rotor position, or the absolute position of the rotor 110 relative to the stator 112. Specifically, the controller 132 may determine the absolute rotor position by employing peak detection, maximum derivative detection, and/or the like, upon the substantially sinusoidal waveforms of the phase currents. For example, as shown in FIG. 7, the controller 132 may correlate the absolute rotational position and/or timing of the rotor 110 with select points of the phase current waveform having the greatest magnitude peak detection and/or the greatest rate of change maximum derivative. The controller 132 may also determine the absolute rotor position based on a phase-locked loop analysis. As shown in FIG. 8, for instance, the controller 132 may initially acquire three alternating phase currents $I_A$, $I_B$, $I_C$ from the generator 106. Using the appropriate filters the controller 132 may be able to transform the three substantially sinusoidal phase currents into two DC phase signals I, I, as shown in FIG. 9. Furthermore, using classical proportional-integral PI control, for example, the controller 132 may be able to control one of the two DC phase signals I, I to zero. The two DC phase signals I, I may be derived by using, for example, $$\begin{bmatrix} I_\alpha \\ I_\beta \end{bmatrix} = \sqrt{\frac{2}{3}} \cdot \begin{bmatrix} \cos\theta & \cos\theta - \left(\frac{2\pi}{3}\right) & \cos\theta + \left(\frac{2\pi}{3}\right) \\ -\sin\theta & -\sin\theta - \left(\frac{2\pi}{3}\right) & -\sin\theta + \left(\frac{2\pi}{3}\right) \end{bmatrix} \begin{bmatrix} I_A \\ I_B \\ I_C \end{bmatrix}.$$

Figure 10:
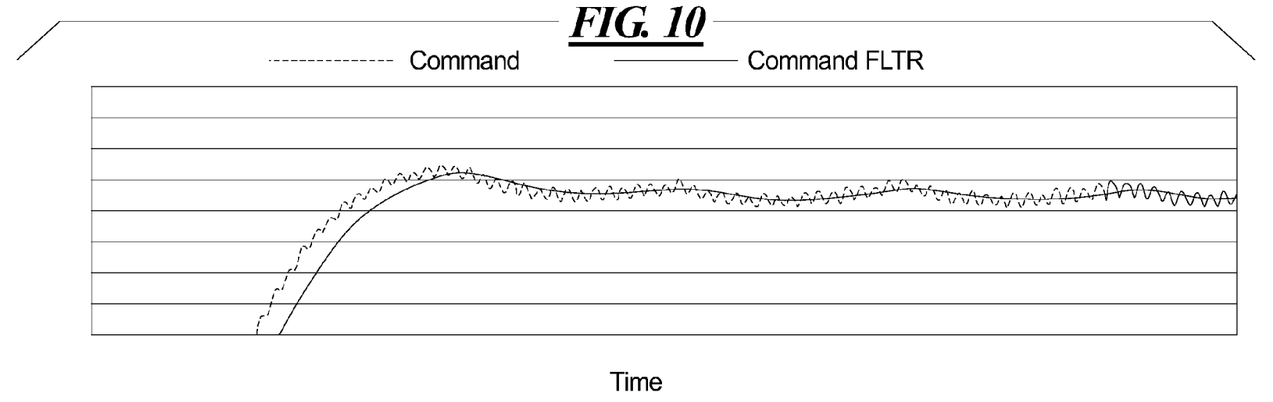
FIG. 10 is a graphical view of the phase angle output from the phase locked loop used to transform the two DC signals of FIG. 9.

From the substantially normalized DC phase signals I, I, the controller 132 may further be configured to determine the absolute rotor position from the offset applied, as illustrated in FIG. 10.

Having determined both relative and absolute rotor positions, the controller 132 may compare the two rotor positions for any error or offset. If there is an offset between the relative and absolute rotor positions provided by the phase currents and the speed sensor signals, the controller 132 may adjust or calibrate the speed sensor signals to fit the absolute rotor position and to substantially eliminate the offset. Moreover, the speed sensor signals may be adjusted by the controller 132, for example, by adjusting the timing or phase thereof such that the relative rotor position directly coincides with the absolute rotor position. Once the rotor position is calibrated to the absolute rotor position, the controller 132 may enable dynamic operator control of the generator 106 to be based on the calibrated speed sensor signals and ensure efficient performance thereof. Furthermore, the controller 132 may optionally end further phase current analyses until the next calibration request or until the next startup of the electric drive 100.

Figure 11:
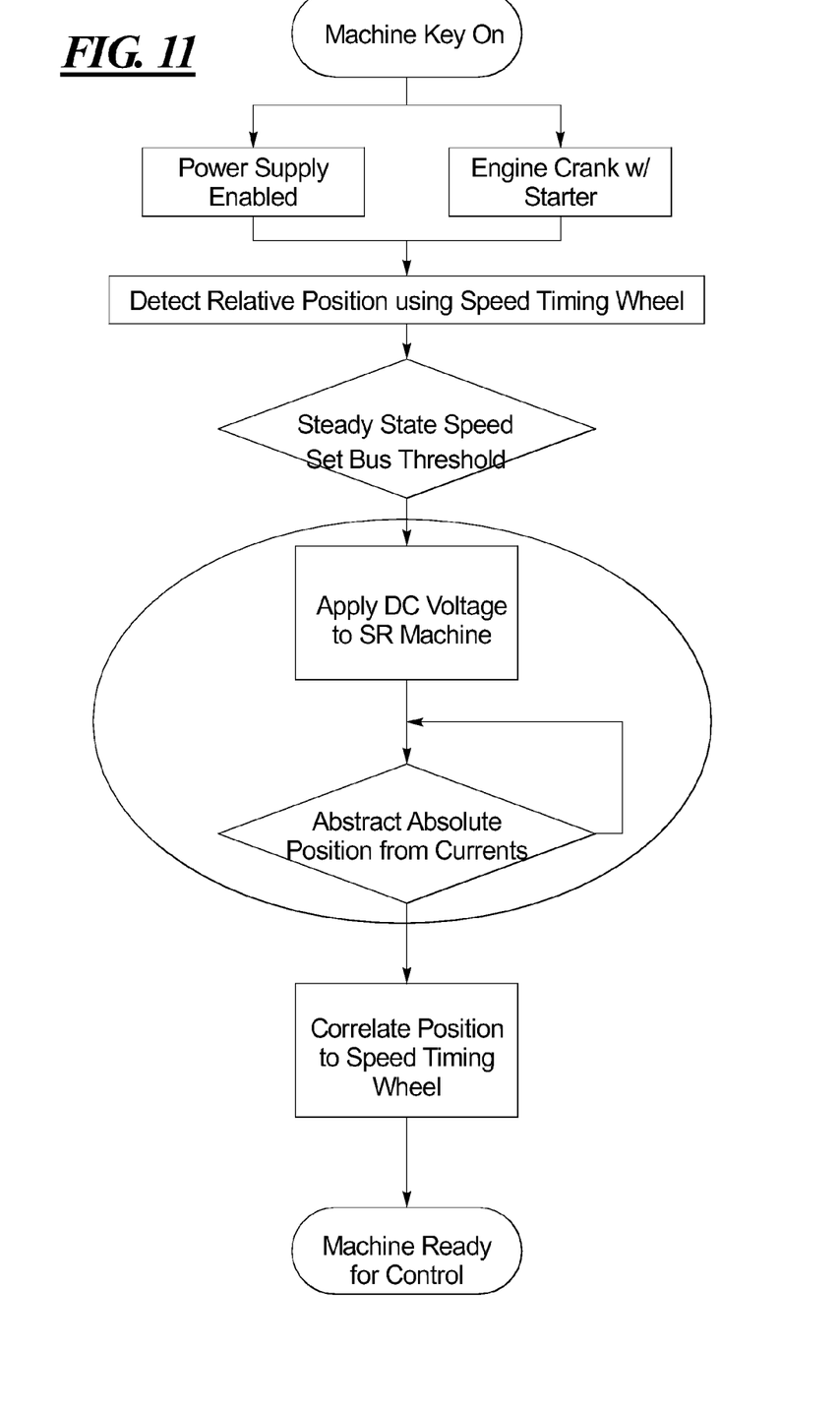
FIG. 11 is a flow diagram of one exemplary method of estimating rotor speed of an electric drive.

Turning now to FIG. 11, another exemplary method of estimating rotor speed of a generator 106 as applied to an electric drive 100 is provided. As shown, the controller 132 of the electric drive 100 may initially monitor for a machine key, button, or the like, to be enabled, for instance, by an operator. Upon startup, the primary power source or engine 102 as well as a secondary power source 126 may be started and enabled. Once power has been enabled, the relative rotor speed or position may be determined based on analysis of a speed timing wheel, or the like. The controller 132 may standby and wait until the engine 102 reaches a consistent idle speed and the electric drive 100 establishes a predefined minimum steady state DC voltage. At steady state, the controller 132 may proceed to supply the DC voltage or source current to the generator 106 so as to induce a phase current for each phase winding of the generator 106. In a manner similar to the method of FIG. 2, the controller 132 may derive an absolute position of the rotor 110 based on the previously derived relative rotor position and analysis of the induced phase current waveforms exhibited by the generator 106. The controller 132 may then calibrate or adjust speed sensor signal waveforms provided by speed sensors 130 to directly correspond to the absolute rotor position previously derived. Once calibration is complete and there is no substantial offset between the relative and absolute rotor positions, the controller 132 may enable full operator control of the electric drive assembly 100.

INDUSTRIAL APPLICABILITY

In general, the foregoing disclosure finds utility in various applications relating to electrical power generation. More specifically, the disclosed systems and methods may be used to provide more efficient control of generators that are typically used in association with electric drive assemblies of power generation machines, as well as electric drive assemblies of industrial work vehicles, mobile machines, and the like. Furthermore, the disclosed rotor position estimation schemes may be applied to electric drive assemblies having switched reluctance generators. Moreover, the systems and methods disclosed herein may be configured to recalibrate as often as desired so as to optimize the efficiency and ruggedness of the associated electric drive assembly.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of estimating rotor speed of a generator having a rotor and a stator, comprising the steps of:
   providing a source current to the stator;
   determining a relative rotor speed based on a sensor signal provided by a rotor speed sensor 130;
   determining a relative rotor position corresponding to the relative rotor speed;
   determining an absolute rotor position based on the sensor signal and phase currents; and
   calibrating the sensor signal based on an offset between the relative rotor position and the absolute rotor position.

2. The method of claim 1, wherein the source current is at least partially supplied by residual voltage in a common bus associated with the generator.

3. The method of claim 1, wherein the source current is at least partially supplied by a direct current DC power supply.

4. The method of claim 1 further comprising a step of enabling dynamic control of the generator based on the calibrated sensor signal.

5. The method of claim 1, wherein the phase currents of the stator are reactive to the source current and induced electricity between the rotor and the stator.

6. The method of claim 1 further comprising steps of applying a phase locked loop to one or more of the phase currents of the stator, transforming the phase currents into two direct current DC signals, controlling one of the two DC signals to zero, and determining the absolute rotor position based at least partially on a phase of the DC signals.

7. A rotor speed estimation system for a generator having a rotor and a stator, comprising:
   a speed sensor configured to generate a sensor signal corresponding to a speed of the rotor relative to the stator; and
   a controller in electrical communication with the speed sensor and the stator, the controller being configured to determine a relative rotor position based on the sensor signal, determine an absolute rotor position based on the sensor signal and phase currents, and calibrate the sensor signal based on an offset between the relative rotor position and the absolute rotor position.

8. The system of claim 7, wherein the controller is configured to selectively communicate a source current to the stator, one or more of the phase currents of the stator being reactive to the source current and induced electricity between the rotor and the stator.

9. The system of claim 8, wherein the source current is at least partially supplied by a direct current DC power supply.

10. The system of claim 7, wherein the controller communicates with the stator through a converter circuit.

11. The system of claim 7, wherein the controller transforms the phase currents into two direct current DC signals.

12. The system of claim 11, wherein the controller applies a phase locked loop to the phase currents of the stator.

13. The system of claim 12, wherein the controller controls one of the two DC signals to zero and determines absolute rotor position based at least partially on a phase of the DC signals.

14. The system of claim 8, wherein the position sensor is configured to generate a sensor signal corresponding to a speed of the rotor relative to the stator.

15. The system of claim 8, wherein the speed sensor includes at least one of a Hall effect sensor, a variable reluctance sensor, an encoder, a resolver and an anisotropic magnetoresistance sensor.

16. An electric drive assembly, comprising:
   a generator having a stator and a rotor, the rotor being coupled to a primary power source and rotatably disposed in close proximity to the stator;
   at least one speed sensor configured to generate a sensor signal corresponding to a speed of the rotor relative to the stator;
   a converter circuit configured to electrically communicate with the stator and at least one load via a common bus; and
   a controller in electrical communication with the speed sensor and the converter circuit, the controller being configured to determine a relative rotor position based on the sensor signal, determine an absolute rotor position based on the sensor signal and phase currents, and calibrate the sensor signal based on an offset between the relative rotor position and the absolute rotor position.

17. The electric drive of claim 16, wherein the controller is configured to selectively communicate a source current to the stator, one or more of the phase currents of the stator being reactive to the source current and induced electricity between the rotor and the stator.

18. The electric drive of claim 17, wherein the controller is configured to engage the primary power source at a low idle speed so as to provide the stator of the generator with the source current.

19. The electric drive of claim 17, wherein the source current is at least partially supplied by residual voltage stored in the common bus.

20. The electric drive of claim 17, wherein the source current is at least partially supplied by a direct current DC power supply.

* * * * *